US005983268A

United States Patent [19]

Freivald et al.

[11] Patent Number: 5,983,268
[45] Date of Patent: Nov. 9, 1999

[54] SPREADSHEET USER-INTERFACE FOR AN INTERNET-DOCUMENT CHANGE-DETECTION TOOL

[75] Inventors: Matthew P. Freivald, Sunnyvale; Mark S. Richards, San Jose; Alan C. Noble, Santa Cruz, all of Calif.

[73] Assignee: NetMind Technologies, Inc., Cambell, Calif.

[*] Notice: This patent is subject to a terminal disclaimer.

[21] Appl. No.: 08/823,761

[22] Filed: Mar. 25, 1997

Related U.S. Application Data

[63] Continuation-in-part of application No. 08/783,625, Jan. 14, 1997.
[51] Int. Cl.$^6$ .................................................. H04L 12/00
[52] U.S. Cl. .......................................... 709/218; 707/513
[58] Field of Search .............................. 395/600; 707/10, 707/9, 513; 709/201; 710/107; 434/350; 713/201

[56] References Cited

U.S. PATENT DOCUMENTS

| | | | |
|---|---|---|---|
| 5,293,615 | 3/1994 | Amada | 395/600 |
| 5,297,032 | 3/1994 | Trojan et al. | 364/408 |
| 5,319,777 | 6/1994 | Perez | 395/600 |
| 5,361,393 | 11/1994 | Rossillo | 395/650 |
| 5,381,470 | 1/1995 | Cambray et al. | 379/216 |
| 5,390,196 | 2/1995 | Cecil et al. | 371/37.1 |
| 5,414,838 | 5/1995 | Kolton et al. | 395/600 |
| 5,437,006 | 7/1995 | Turski | 395/155 |
| 5,446,888 | 8/1995 | Pyne | 395/600 |
| 5,784,545 | 7/1998 | Anderson et al. | 395/148 |
| 5,813,007 | 9/1998 | Nielsen | 707/10 |
| 5,819,271 | 10/1998 | Mahoney et al. | 707/9 |

OTHER PUBLICATIONS

AlphaConnect StockVue, Microsoft Excel 97, PC Magazine, Feb. 18, 1997, pp. 136, 137, 156.
Assembling the Ultimate Browser, Matt Lake, C/Net Reviews, Dec. 18, 1996.
Microsoft Excel 97 Help Files, PC Quote Web Query Files & Examples, Feb. 1997.

Primary Examiner—Ahmad F. Matar
Assistant Examiner—Thong Vu
Attorney, Agent, or Firm—Stuart T. Auvinen

[57] ABSTRACT

A change-detection tool detects significant changes in numerical fields within internet web pages on the world-wide-web. A user identifies web-page web pages by specifying the web page's URL. The user then highlights one or more numeric fields on the web-page web page. The numeric fields' values are extracted to cells on a spreadsheet displayed to the user. The user enters parameters and formulas into unused spreadsheet cells. The formulas operate on the numeric values extracted from the web page to the spreadsheet's cells. The user also enters notification limits or conditions that are based on the results of the formulas. The notification conditions indicate when a change notification is to be e-mailed to the user. After the user finishes registering the web-page web page, the change-detection tool periodically retrieves the web-page web page at the specified URL and re-calculates the formulas and determines if the notification conditions have been met. The change-detection tool automatically retrieves web pages and re-calculates the formulas and conditions specified by the user in the spreadsheet. Arbitrary formulas can be used to perform arbitrary calculations on the web data and specify arbitrary conditions for user notification. Numeric data from multiple web pages can be extracted to the same spreadsheet, allowing numeric data from different, unrelated web pages to be combined in the calculations of the spreadsheet.

19 Claims, 6 Drawing Sheets

|   | A | B | C |
|---|---|---|---|
| 1 | WWW DATA1 LINK | FORMULA1 | NOTIFYCOND1 |
| 2 | WWW DATA2 LINK |  | NOTIFYCOND2 |
| 3 |  | FORMULA2 |  |
| 4 | PARAM1 | FORMULA3 | PARAM4 |
| 5 | PARAM2 |  |  |
| 6 | PARAM3 |  |  |
| 7 |  | FORMULA4 |  |

| E-MAIL ADDR |
|---|
| FORMULA1,2... |
| PARAM1,2... |
| NOTIFYCOND1,2... |
| URL1 |
| MKR1A,1B |
| URL2 |
| MKR2A,2B |

SPREADSHEET USER-INTERFACE FOR AN INTERNET-DOCUMENT CHANGE-DETECTION TOOL

BACKGROUND OF THE INVENTION—RELATED APPLICATION

This application is a continuation-in-part of the co-pending application for "Change-Detection Tool Indicating Degree and Location of Change of Internet Documents by Comparison of CRC Signatures", U.S. Ser. No. 08/783,625, filed Jan. 14, 1997.

BACKGROUND OF THE INVENTION—FIELD OF THE INVENTION

This invention relates to software retrieval tools for networks, and more particularly for a calculation-based user interface to a change-detection tool for the Internet.

BACKGROUND OF THE INVENTION—DESCRIPTION OF THE RELATED ART

The world-wide-web (www) is the fastest-growing part of the global network known as the Internet. Documents on the web are known as web pages. These web pages are frequently changed. Users often wish to know when changes are made to certain web pages. The parent application disclosed a change-detection tool which allows users to register web pages. These registered web pages are periodically fetched and compared to a stored checksum for the registered page to determine if a change has occurred. When a change is detected, the user is notified by e-mail. The change-detection tool of the parent application allows user to select portions of a web-page document for change detection while other portions are ignored.

Such a change-detection tool as described in detail in the parent application is indeed useful and has gained popularity with Internet users, as several hundred thousand web pages have been registered. For example, patent professionals can register the federal regulations and procedures (37 C.F.R. and the M.P.E.P) posted at the PTO's web site and be notified when any changes are made. The change-detection tool is currently free for public use at the www.netmind.com web site.

Often the information desired on the Internet is numeric rather than textual. For example, investors use the Internet to obtain stock prices, volume, and financial information on companies to make investing decisions. The desired information is numeric, although it is often surrounded by textual information.

Various software tools are emerging to automate the process of extracting numeric information from web pages. For example, Alpha Microsystems of Santa Ana, Calif. has a filtering tool known as "StockVue" which allows users to specify a number of stocks. The tool queries a web site to obtain prices, volume, and other information on the stocks. The queries can be performed manually or automatically. The user can also input the number of shares he owns of each stock and the tool calculates the current value from the stock price.

While such a tool is useful for obtaining stock quotes, it is not a general-purpose tool. It does not query for other kinds of numeric information, such as weather information, airline ticket prices, or statistical information. Only a few of the millions of web pages are accessed; the "content" from the Internet is limited to a few financial sites with formats readable by the software tool. The calculations performed are rather limited, being pre-programmed into the software. The user cannot specify arbitrary calculations.

Other application-specific tools are disclosed in U.S. Pat. Nos. 5,297,032, 5,414,838, for securities trading. These generally use one or more specific databases rather than arbitrary documents located anywhere on the Internet.

Spreadsheet programs allow the user to specify arbitrary calculations using cells containing constants, parameters, and formulas. Links to the Internet can also be embedded into spreadsheet cells using Microsoft's Excel for Office/97. The links can be used to jump to a particular web page, or a more complex Internet query file (IQL) can be used to extract some data items from a web page. All data in all tables are returned from a web page; the user cannot specify that only a few data items are returned. Microsoft Excel allows the user to retrieve all data in all tables, or the entire contents of a web page. Web pages can be specifically designed to work with Excel by having just a small table with the desired data items. Microsoft Excel is not designed for arbitrary web pages because data is extracted from a small table or all data on the page is returned; the user cannot extract just the interesting data items. Indeed, an entire paragraph from a web page is imported into a single cell. Another disadvantage is that the user must explicitly update the link; the user is not notified when the data on the linked web page changes.

What is desired is an automated change-detection tool which detects when changes occur to a registered document on the Internet. It is desired that the user not have to check the web page to see if any changes have occurred. A change-detection tool adapted for numeric data is desired. A change-detection tool which can perform arbitrary, user-specified calculations is desirable. It is also desired that the numeric data be obtained from any arbitrary document anywhere on the Internet.

SUMMARY OF THE INVENTION

A change-detection web server detects numerically-significant changes in web pages. A network connection transmits and receives packets from a remote client and a remote web-page server. A responder is coupled to the network connection. It communicates with the remote client. The responder registers a web page for change detection by receiving from the remote client a uniform-resource-locator (URL) that identifies the web page. The responder fetches the web page from the remote web-page server and generates markers for identifying locations of numeric data fields within the web page.

A spreadsheet user-interface is coupled to the responder. It displays a spreadsheet on the remote client. The spreadsheet has rows and columns of cells, and each cell is for receiving a formula from a user. The formula specifies calculations performed on the numeric data fields from the web page.

A database is coupled to the responder. It receives the URL and the markers from the responder receives the formula from the spreadsheet user-interface when the web page is registered by the remote client. The database stores a plurality of records each containing a URL, markers, and the formula for a registered web page.

A periodic minder is coupled to the database and the network connection. It periodically re-fetches the web page from the remote web-page server by transmitting the URL from the database to the network connection. The periodic minder receives a fresh copy of the web page from the remote web-page server. The periodic minder extracts fresh numeric values from the fresh copy of the web page from locations identified by the markers and recalculates a result of the formula using the fresh numeric values. The periodic minder signals a detected change to the remote client when the result exceeds a predetermined notification condition.

Thus a numerically-significant change in the web page is detected by recalculating a user-entered formula which operates on numeric data from the web page. Changes in the web page which do not cause a recalculated result to exceed the predetermined notification condition do not signal the remote client.

In further aspects of the invention the database does not store the web page. Instead, the database stores a formula for re-calculating the result using the fresh numeric values on the web page. Thus storage requirements for the database are reduced by archiving the formula and not entire web pages.

In further aspects a selection means is coupled to the responder. It receives a selection from the remote client and identifies the numeric data fields within the web page. A parsing parses the web page and generates the markers identifying the locations of the numeric data fields. A compare means compares the result to the predetermined notification condition.

In still further aspects each record in the database has a notification condition field for storing the predetermined notification condition. Thus the predetermined notification condition is stored in the database for each record.

In still further aspects a calculation engine receives the formula from the database and the fresh numeric values extracted from the fresh copy of the web page. It re-calculates the result. The web page is a hyper-text markup-language (HTML) web page containing HTML tags that indicate formatting, layout, and hyper-links specifying URLs of other servers.

In still further aspects of the invention a mailer means is coupled to the network connection to send a change notification message to the remote client when the change is signaled. The responder receives an electronic-mail address from the remote client and stores the electronic-mail address of the remote client in the database. Thus the remote client is notified of the change by electronic mail.

DETAILED DESCRIPTION

The present invention relates to an improvement in change-detection software tools. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

OVERVIEW OF CHANGE-DETECTION WEB SERVER

Figure 1:
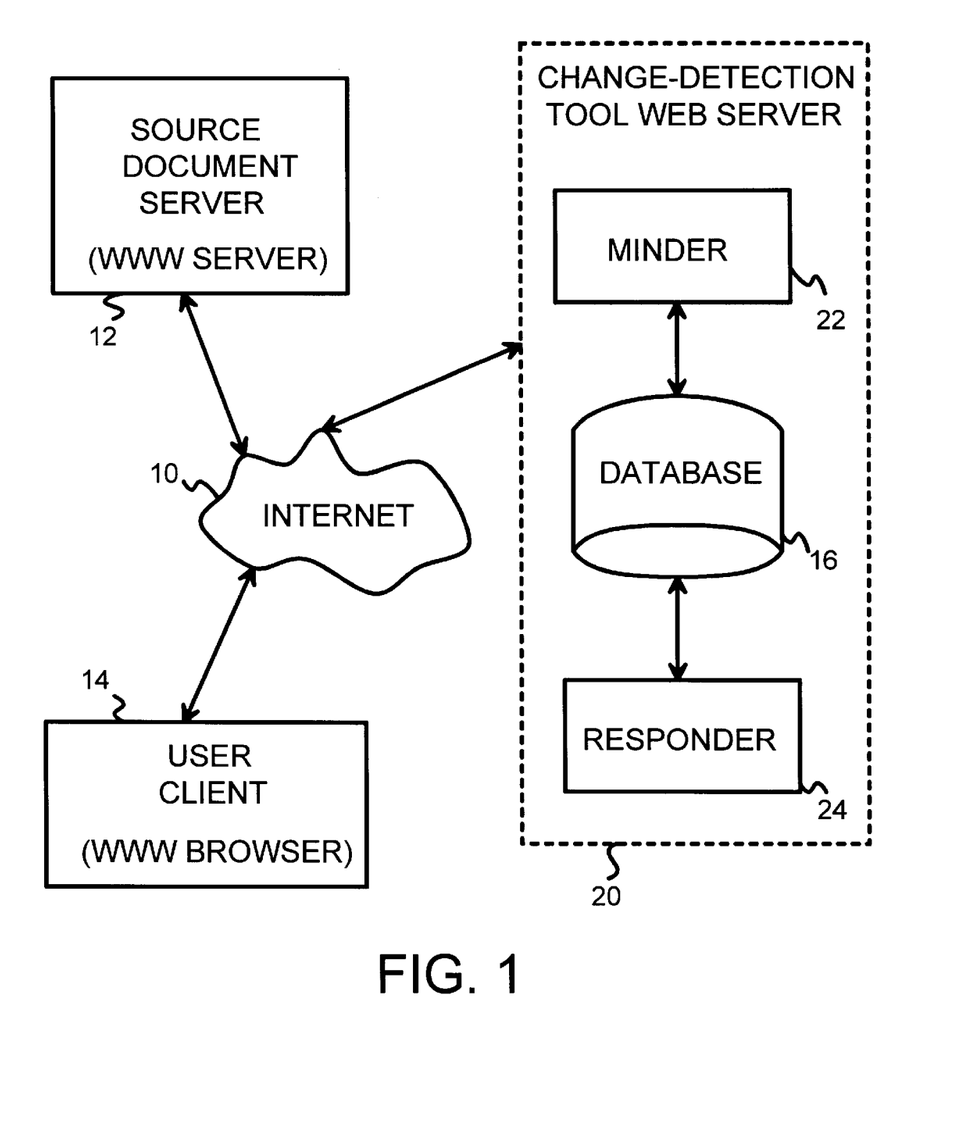
FIG. 1 is a diagram of a change detection tool on a server on the Internet.

FIG. 1 is a diagram of a change detection tool on a server on the Internet. The user operates client 14 from a remote site on Internet 10. The user typically is operating a browser application, such as Netscape's Navigator or Microsoft's Internet Explorer, or a browser mini-application such as an Internet toolbar in a larger program. Client 14 communicates through Internet 10 by sending and receiving TCP/IP packets to establish connections with remote servers, typically using the hypertext transfer protocol (http) of the world-wide web.

Client 14 retrieves web pages of files from document server 12 through Internet 10. These web pages are identified by a unique URL (uniform resource locator) which specifies a document file containing the text and graphics of a desired web page. Often additional files are retrieved when a document is retrieved. The "document" returned from document server 12 to client 14 is thus a composite document composed of several files of text, graphics, and perhaps sound or animation. The physical appearance of the web page on the user's browser on client 14 is specified by layout information embedded in non-displayed tags, as is well-known for HTML (hyper-text markup language) documents. Often these HTML documents contain tags with URL's that specify other web pages, perhaps on other web servers which may be physically located in different cities or countries. These tags create hyper-links to these other web servers allowing the user to quickly jump to other servers. These hyper-links form a complex web of linked servers across the world; hence the name "world-wide web".

The user may frequently retrieve files from remote document server 12. Often the same file is retrieved. The user may only be interested in differences in the file, or learning when the file is updated, such as when a new product or service is announced. The inventors have developed a software tool which automatically retrieves files and compares the retrieved files to an archived checksum of the file to determine if a change in the file has occurred. When a change is detected, the user is notified by an electronic mail message (e-mail). A copy of the new file may be attached to the e-mail notification, allowing the user to review the changes.

Rather than archive the source files from remote document server 12, the invention archives a checksum or CRC of the source files. These CRC's and the e-mail address of the user are stored in database 16 of change-detection server 20. Comparison is made of the stored or archived CRC of the document and a fresh CRC of the currently-available document. The CRC is a condensed signature or fingerprint of the document. Any change to the document changes the CRC.

Change-detection server 20 performs three basic functions:

1. Register (setup) a web page document for change detection.

2. Periodically re-fetch the document and compare for changes
3. E-mail a change notice to the registered user if a change is detected.

Change-detection server 20 contains three basic components. Database 16 stores the archive of CRC's for registered web-page documents. The URL identifying the web page and the user's e-mail address are also stored with the archived CRC's. Responder 24 communicates with the user at client 14 to setup or register a web page document for change detection. Minder 22 periodically fetches registered documents from document server 12 through Internet 10. Minder 22 compares the archived CRC's in database 16 to new CRC's of the fetched documents to determine if a change has occurred. When a change is detected, minder 22 sends a notice to the user at client 14 that the document has changed.

CHANGE-DETECTION OF WEB PAGES

This change-detection tool is disclosed in the co-pending parent application, "Change-Detection Tool Indicating Degree and Location of Change of Internet Documents by Comparison of CRC Signatures", U.S. Ser. No. 08/783,625, filed Jan. 14, 1997, hereby incorporated by reference. A basic change-detection tool without a spreadsheet user-interface and without user-selections within a web page has been available for free public use at the inventor's web site, www.netmind.com, for more than a year before the filing date of the present application. The existing "URL-minder" has over 150,000 documents or URL's registered for 1.4 million users.

CALCULATIONS ON NUMERIC DATA DESIRABLE

While the change-detection tool of the parent application could be used to register web pages with numeric data, it is often desirable to perform calculations on the numeric data. These calculations can be used to determine if the change is significant enough to warrant notifying the user. For example, the user may not want to be notified when the numeric data changes by a small amount. A 2% change in a stock price may not be significant to a long-term investor, while the user/investor does want to be notified when the stock price changes by 20%. The current change-detection tool notifies the user for any change, even the small 2% change. Thus notices are generated for many numerically insignificant changes.

The change-detection tool can be programmed by the user to ignore small changes in the numeric values. Then only larger, more significant change in the numeric value generates a change notice to the user. Other users may want the software to perform more complex calculations on the numeric data before deciding to notify the user. Another investor may want to be notified only when his total portfolio value reaches a fixed dollar amount, such as $10,000. This investor could program the change-detection tool to extract several stock prices from a web page and then multiply each stock price by the number of shares he holds to arrive at the total portfolio value. When this portfolio exceeds a set amount, a notification is made. A bond analyst may want to be notified when the current ratio of a company drops by more than 20%, indicating that the company may face a cash shortage. The current assets and current liabilities could be extracted from the company's financial statement and the current ratio calculated and compared before a notice is made. A powder skier may want to be notified when the snow exceeds a certain depth. The uses for such a numeric change-detection and calculation tool are as varied as the users of the Internet.

CHANGE-DETECTION OF NUMERIC VALUES—OVERVIEW

Changes in numeric data are detected in arbitrary documents or web pages on the internet. The web pages may also contain text, graphics image files and sound or video files. Most web pages are HTML files and have a structure which can be exploited to locate the numeric data on the page. Once the numeric data is located on a page, it can be extracted. Calculations are then performed on the extracted data to determine if a change significant enough for notification has occurred.

The responder is the software module which responds to user requests to register a web page for change detection. The user identifies the web page by its URL, and then identifies the numeric data by selecting or highlighting the numeric data on a copy of the web page. The responder locates the highlighted numeric data and stores markers to later locate the numeric data. The markers can be HTML tags or text before or after the highlighted numeric data. Non-highlighted data and text on the web page are ignored, and no change notification is made when changes occur in the non-highlighted portions of the registered web page.

A spreadsheet user interface is also displayed to the user by the responder. The responder copies the highlighted or extracted data from the web page to cells in the spreadsheet. The user enters constants or parameters in other cells, and one or more formulas in other cells. The formulas perform calculations on the extracted data from the web page and the user's parameters. The results of these formulas are displayed in the formula's cells rather than the formula itself. The user then enters notification limits for the results. The notification limits indicate when a notification is to be made.

RESPONDER USES SPREADSHEET GUI—FIG. 2

Figure 2:
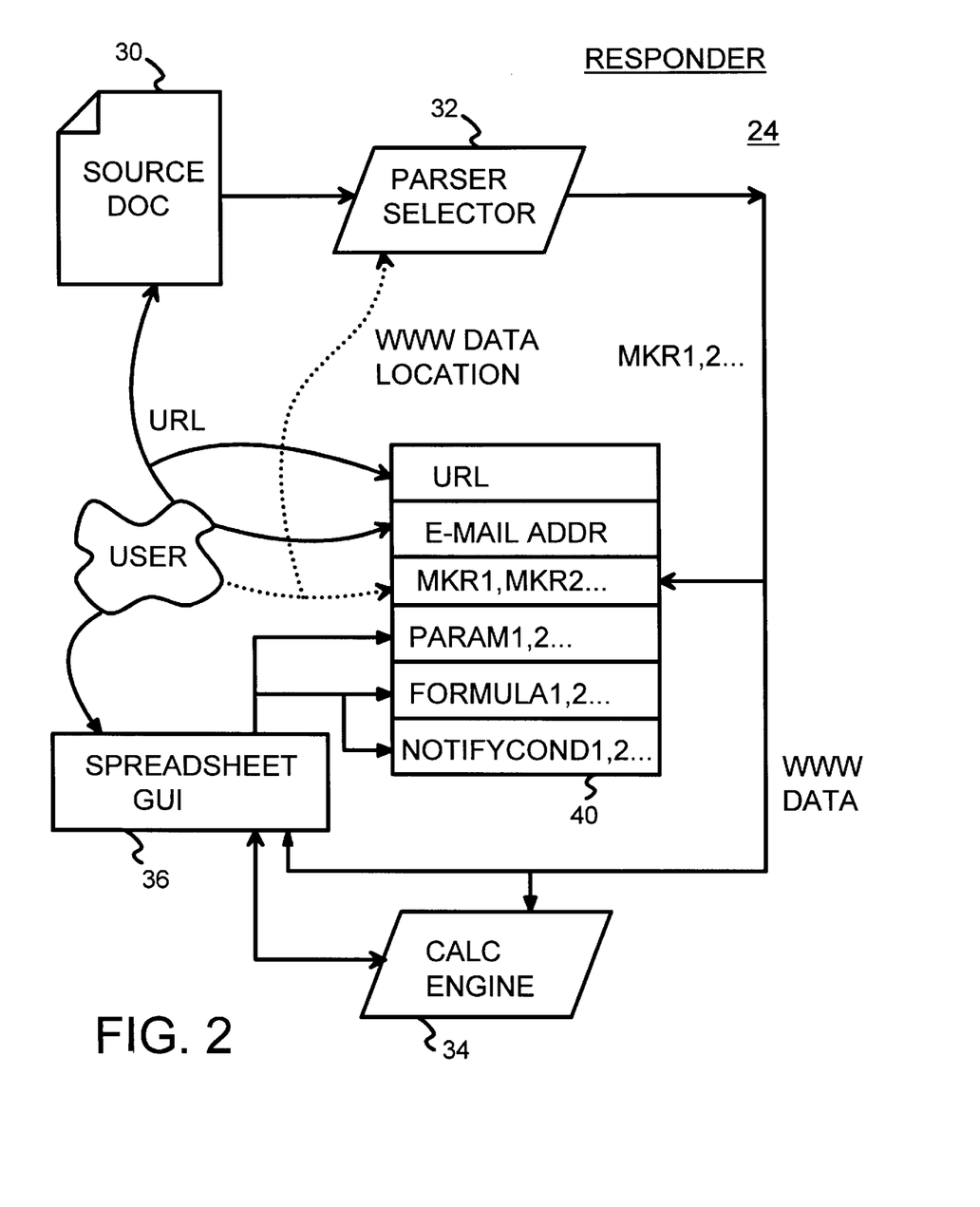
FIG. 2 illustrates the operation of responder 24 of FIG. 1.

FIG. 2 illustrates the operation of responder 24 of FIG. 1. The user initiates registration of a document by providing the URL identifying the document and the user's e-mail address. These can be provided by typing or pasting them into fields on a registration web page at change-detection server 20. The URL and the user's e-mail address are stored in record 40 in database 16 of FIG. 1.

Change-detection server 20 uses the URL to fetch a copy of source document 30 from document server 12 of FIG. 1. Source document 30 could be any one of millions of documents on the thousands of web servers connected to the Internet. Source document 30 is displayed to the user, allowing the user to select numeric portions of source document 30 for registration. The user can select portions of source document 30 by dragging a highlight with a mouse over the numeric value to be selected. Alternately, the user can select a single numeric value by double-clicking on the numeric value or field. Changes which occur in unselected portions of source document 30 do not generate change notifications.

The location of the user's highlight or selection is transmitted to parser 32. Parser 32 reads characters from source document 30 one at a time until the numeric string at the highlighted location is found. This location could be identified for future use by an offset in bytes or all characters from the beginning of the file to the beginning of the user's selection. A preferred way to identify the location of the selected numeric value is to store several characters immediately preceding the selection and/or several characters after the selected numeric value. These characters preceding and following the user's selection are known as a "marker", and the marker is sent from parser 32 to be stored in the marker field in record 40 of FIG. 1's database 16.

The process of the user highlighting a numeric value, and the parser generating a marker for storage in record 40 is repeated as many times as the user wishes. Thus the user may make several selections on the same source document 30, and each selection has it's marker generated by parser 32 and stored in record 40.

The location of the marker can change when changes are made to the web page document in the non-selected region before the selected numeric value, such as in a document header. Thus the marker's location can change even when the selected numeric value has not changed, and changes in the header should be ignored. If the marker disappears altogether, the user can be notified and allowed to change the spreadsheet entries.

SPREADSHEET USER INTERFACE

Parser 32 extracts the numeric value highlighted by the user and transmits the extracted numeric value to spreadsheet user-interface 36 and to calculation engine 34.

Spreadsheet user-interface 36 generates a display of a spreadsheet to the user and displays the numeric value in a cell on the spreadsheet displayed to the user during registration. Each additional numeric value highlighted appears in a different spreadsheet cell.

The user can also enter constants or parameters by typing them into unused cells on his spreadsheet display. Each parameter is stored in record 40 as PARAM1, PARAM2, etc. The user then types one or more equations or formulas into other unused cells on the spreadsheet display, and these formulas are encoded by spreadsheet user-interface 36 and stored in record 40 as FORMULA1, FORMAULA2, etc. Once the user finishes typing in a formula, calculation engine 34 calculates the result and spreadsheet user-interface 36 displays the numeric result of the formula in the cell instead of the formula. Extracted data, user-entered parameters, and even results from other formulas can be operands of the new formula by specifying the x,y cell name of the cell displaying the extracted data, parameter, or formula's result.

Finally, the user specifies the conditions when notification is to be made. A comparison formula such as "NOTIFY WHEN B4 >5" is entered into another cell and stored as the notification condition NOTIFYCOND1. An alternative approach is to store the comparison formula as another formula, with the notification condition field of record 40 storing the cell location of this comparison formula. Another alternative is for the notification condition to be typed into a separate area of the display, separate from the spreadsheet itself.

Note that the numeric value itself does not have to be stored; notification depends on the result of a calculation based on the numeric value, and the notification limits or conditions NOTIFYCOND1, NOTIFYCOND2, etc. are stored in record 40 rather then the numeric value extracted from the web page. Since the numeric values are not stored, a checksum is not needed as in the parent application's change-detection tool.

MINDER RE-CALCULATES USING NEWLY-EXTRACTED DATA—FIG. 3

Figure 3:
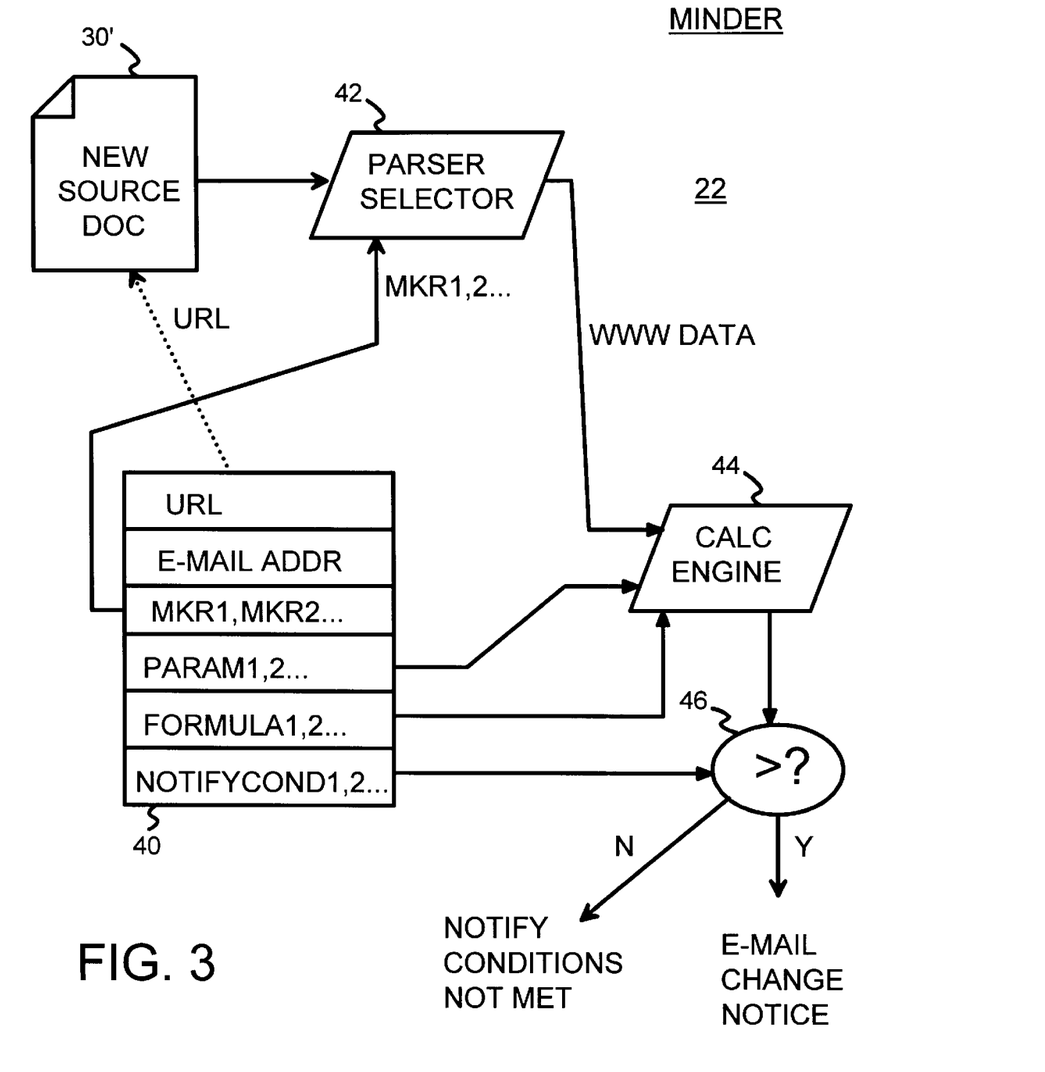
FIG. 3 illustrates operation of minder 22 of FIG. 1 when the notification condition must be re-calculated using newly extracted data.

FIG. 3 illustrates operation of minder 22 of FIG. 1 when the notification condition must be re-calculated using newly extracted data. The minder performs change-detection on each of the thousands of documents having their URL's registered. Checking is preferably performed once for all users registering the same URL since this saves re-fetching documents for different users.

The minder begins by reading record 40 from database 16 of FIG. 1. The URL in record 40 is used to access the remote document server on the Internet and retrieve a fresh document copy 30' of source document 30 which was registered as described for FIG. 2. Fresh document copy 30' is parsed by parser 42 until the first marker MKR1 is found. The new numeric value is extracted from copy 30' after or before the marker, and the newly extracted numeric data is sent from parser 42 to calculation engine 44.

This process continues for each marker in record 40 until all markers are found in document copy 30' and their numeric values extracted and sent to calculation engine 44. Once all numeric values are extracted from document copy 30', the parameters stored in record 40 are also sent to calculation engine 44 along with the formulas stored in record 40. Calculation engine 44 calculates the results of each formula using the parameters from record 40 and the extracted web-page data from parser 42.

The notification conditions from record 40 are then sent to comparator 46, which also receives the results calculated by calculation engine 44. Comparator 46 determines if one or more of the notification conditions have been met. When a notification condition is met, then a change notice is sent to the e-mail address stored in record 40. When none of the notification conditions is met, then no notification is made. Minder 22 then reads the next record and performs checking for the next registration.

SPREADSHEET DISPLAY—FIG. 4

Figure 4:
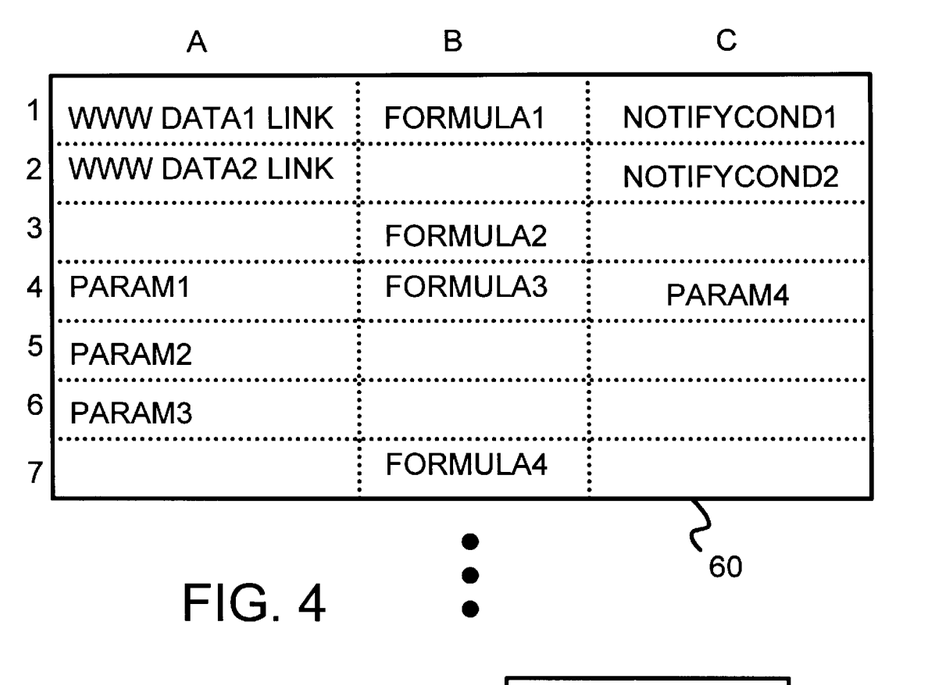
FIG. 4 is a diagram of a spreadsheet displayed to the user for entering calculations of web-page numeric data during registration for change detection.

FIG. 4 is a diagram of a spreadsheet displayed to the user for entering calculations of web-page numeric data during registration for change detection. Spreadsheet 60 is displayed to the user as a grid of cells. Each cell is identified by its x,y location. For example, cell A4 contains a user-entered parameter PARAM1, while cell B3 contains a user-entered formula, FORMULA1. The formulas entered use cell names as operands or variables. A reference to a cell containing a formula returns the result of the formula.

Cells A1 and A2 each contain a numeric value extracted from a web page. Each time the minder retrieves the web page, new data values are extracted and put into the cell A1, A2. Cells A4, A5, A6, and C4 contain user parameters, which are variables used by formulas in cells B1, B3, B4, or B7. Notification conditions are entered in cells C1, C2.

The user is free to place the parameters and formulas in any of the unused cells of spreadsheet 60. The extracted data is placed in the first cells by the user interface as each numeric value is extracted. The user can move these extracted data values to other cells by dragging or cutting and pasting them. The notification conditions can also be placed in any of the cells, or special cells can be designated by the user interface as notification cells.

MULTIPLE WEB PAGES AS SOURCES—FIG. 5

Figure 5:
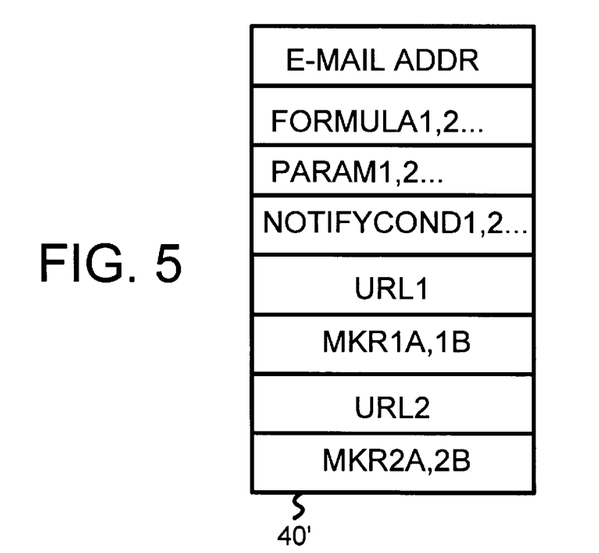
FIG. 5 is a diagram of a registration record when the numeric values are extracted from multiple web pages.

FIG. 5 is a diagram of a registration record when the numeric values are extracted from multiple web pages. The change-detection tool is no longer limited to detecting and reporting changes on one web page at a time. Instead, the numeric values can be extracted from several web pages. The calculations specified on the spreadsheet can operate on numeric values extracted from multiple web pages. This is a powerful feature since the user can combine data from different, arbitrary web pages and perform calculations on these varied data sources to receive a combined notification.

Record 40 of FIGS. 2,3 is expanded to allow multiple URL's to be stored. Each URL has a set of one or more markers for that web page. Thus the web page addressed by URL1 contains markers MKR1A, MKR1B, MRK1C, etc., while another web page addressed by URL2 contains markers MKR2A, MKR2B, MRK2C, etc. Data on additional web pages can be referenced be expanding record 40' to include additional URL and marker fields.

Each data value extracted is placed in a different spreadsheet cell, regardless of the source web page. The formulas and notification conditions can have numeric values extracted from any of these web pages. The user merely uses the cell's name in the formula to reference data values from any source web page. A parameter can be used by any formula or notification condition.

Record 40' contains one e-mail address for the registration, and one set of formulas, parameters, and notification conditions. Record 40' can be split among several databases for storage or processing efficiency.

REGISTRATION PROCEDURE—FIG. 6

Figure 6:
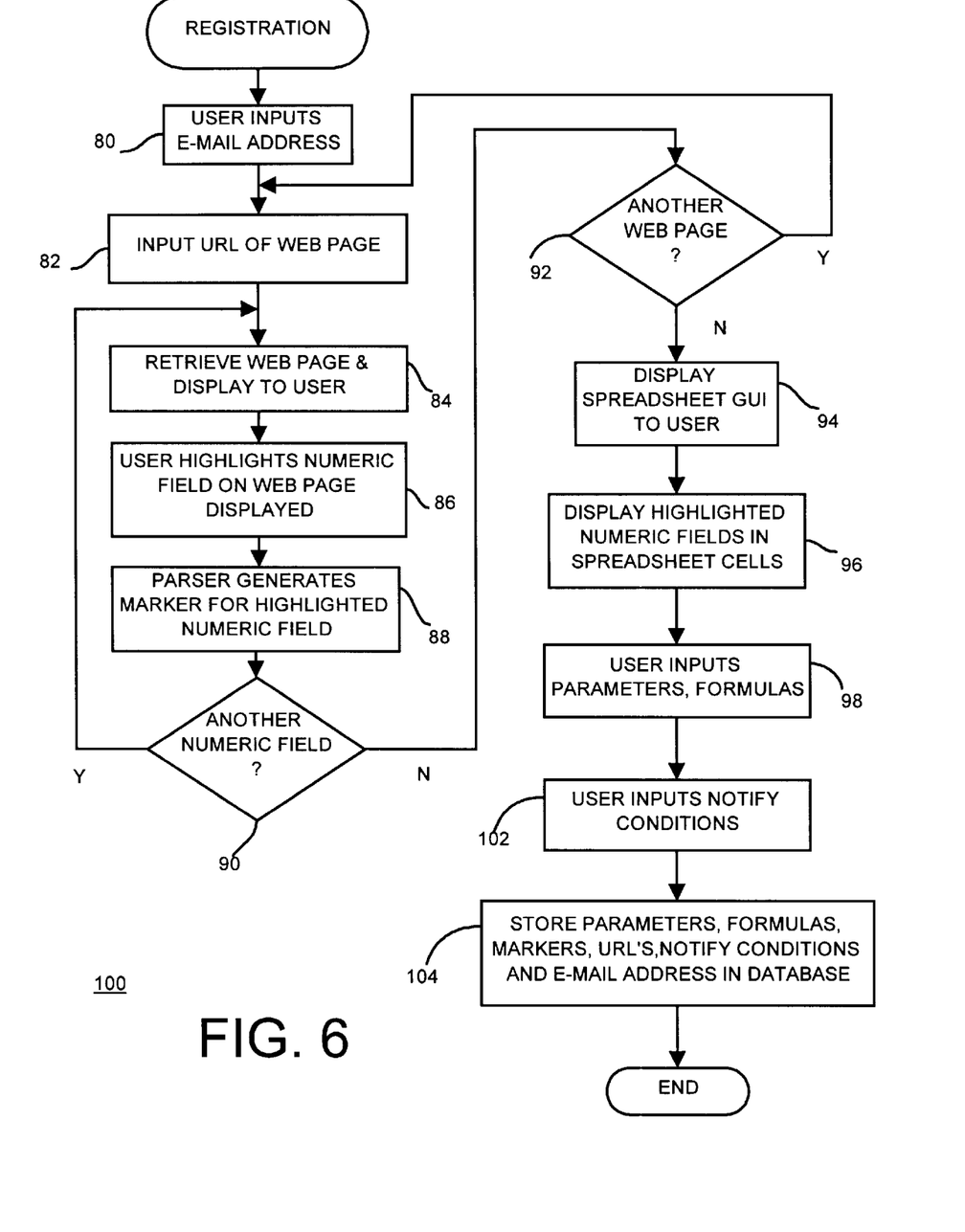
FIG. 6 is a flowchart of the responder accepting a calculational registration for change-notification when the data is extracted from multiple web pages.

FIG. 6 is a flowchart of the responder accepting a calculational registration for change-notification when the data is extracted from multiple web pages. During registration procedure 100, the responder requests that the user input his e-mail address (step 80) and specify a URL (step 82). The web page addressed by that URL is retrieved and displayed to the user (step 84), who highlights a data value (step 86). Once the parser generates the marker for the highlighted data value (step 88), the responder asks the user to highlight another data value (step 90), and the process is repeated for other numeric values if requested.

When the user indicates that no more data values are on the web page (step 90), then the responder ask the user to enter another URL (steps 92, 82). When the user enters another URL, a second web page is retrieved and displayed, allowing the user to highlight additional data values on the second page. The procedure of steps 82–92 is repeated for other web pages until the user indicates that no more web pages are needed.

The responder then displays a spreadsheet to the user (step 94), with each of the highlighted data values shown in different spreadsheet cells (step 96). The user enters parameters by typing numbers into cells. The user enters formulas by typing equations starting with an equal sign "=" with cell names as variables (step 98). The formulas can use standard arithmetic operators such as add, subtract, multiply, divide, use parenthesis, and more complex operators such as a column or range sum, minimum, or maximum, average. Square, cube and other roots are often used for calculating annualized growth rates.

The user finally enters the notification conditions (step 102). The notification conditions are formulas which are evaluated to true or false, such as "greater than", "less than or equal to". The notification conditions can be identified by beginning as a keyword such as "NOTIFY WHEN", or all conditional formulas can be interpreted as notification conditions by the user interface. Conditional formulas can also be combined together such as a notify when C3 and C4 and C5 are all true. Many arbitrary calculations and conditions can thus be checked for.

The responder stores the parameters, formulas, and notification conditions entered by the user in the registration record in the database (step 104). Thus data values from multiple web pages can be combined together into a single notification condition using the spreadsheet user interface.

EXAMPLE OF CHANGE DETECTION OF AIRLINE FARE WAR—FIG. 7

Figure 7:
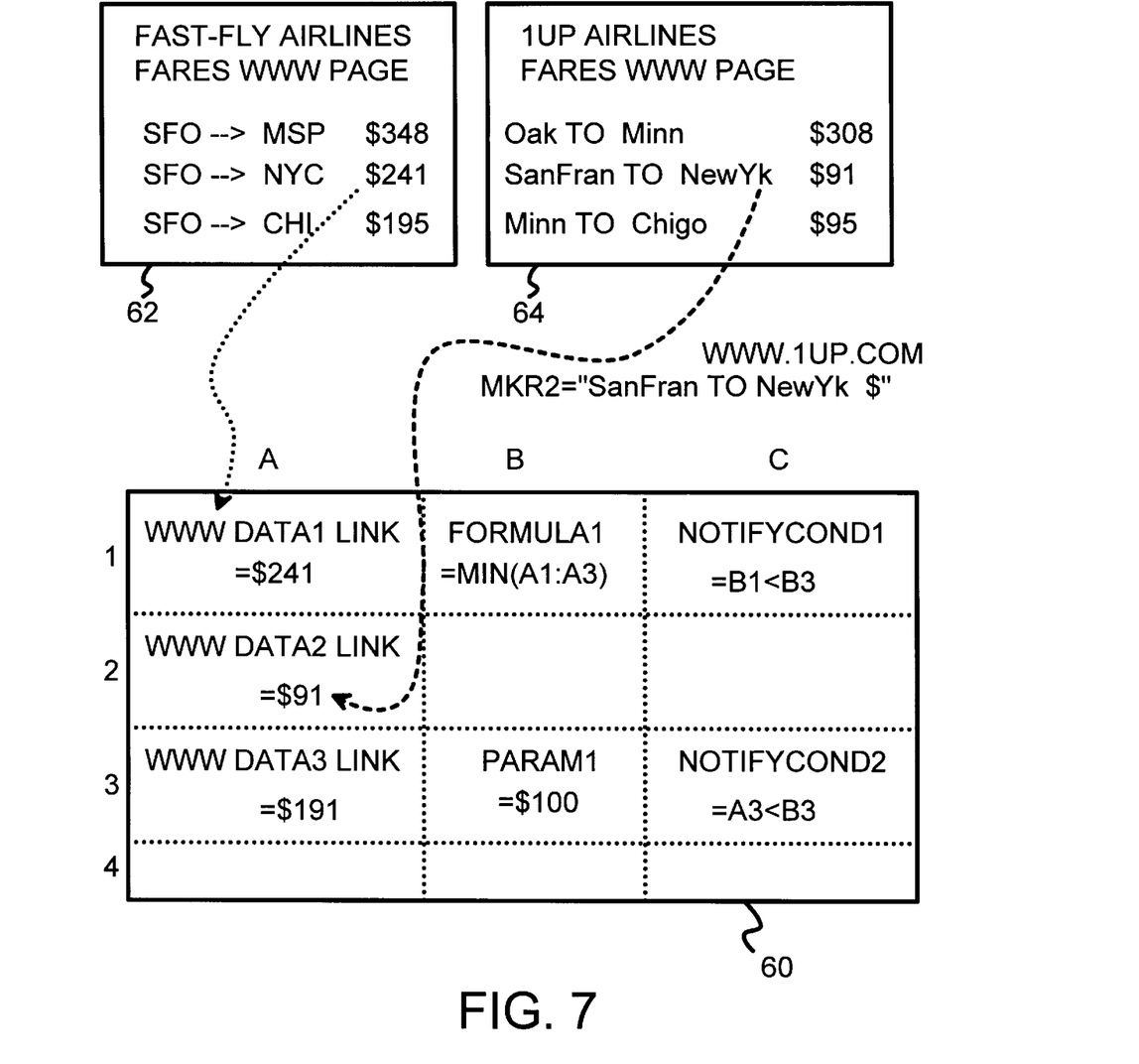
FIG. 7 is an example of a spreadsheet user interface to a change-detection tool programmed to detect low airline fares from multiple web pages of different airlines.

FIG. 7 is an example of a spreadsheet user interface to a change-detection tool programmed to detect low airline fares from multiple web pages of different airlines. Airlines occasionally have abnormally low-cost fares. These fares are only good for a few days until prices return to normal. These low air fares are often matched or undercut by other air carriers. However, these low air fares can occur suddenly without warning. All the low-price tickets can sell before an interested passenger can purchase a ticket.

An interested passenger could check each of the airlines fare pages on the world-wide web on a periodic basis to look for low fares. However, this becomes tiresome. The change-detection tool can be used to periodically monitor air fares for unusually low fares, indicating that a fare war has started. When low fares are detected, the prospective passenger is notified by e-mail.

Web page 62 is a page on a first airline's web site which list air fares for several routes. The passenger desires a flight from San Francisco (SFO) to New York City (NYC), but wants to pay less than $100. The passenger is willing to wait to travel until a fare war breaks out. Web page 62 is frequently updated with adjustment to the fares, and occasionally flights are added or deleted.

The passenger/user can register web page 62, highlighting the current fare for the SFO to NYC flight. The responder creates a marker for the fare (numeric data) by storing the keyword or string "SFO →NYC $" which occurs just before the price "241". The current numeric value of 241 is copied to cell A1 in spreadsheet 60.

Other airlines may offer lower fares. Thus web page 64 for a competing airline is also registered during the same registration session. The marker for web page 64 is somewhat different from the marker for web page 62, since the web pages can have completely different formats. Thus the marker which identifies the San Francisco to New York flight is "SanFran to NewYk $". This marker is stored in the registration record, allowing the desired fare "91" to be extracted to cell A2.

The user can also check other airline's fares by creating other links such as the one shown for cell A3. The formula in cell B1 finds the lowest fare of the three airlines with links in cells A1, A2, A3 using the MIN function. A parameter of $100 is entered into cell B3. Cell C1 sets a notification condition of B1<B3, which causes a notification to be sent to the user when the minimum air fare is less than the parameter of $100 in cell B3. Since cell A2 is 91 in the example, cell B1 returns 91, and cell C2 returns true, causing a notification to be sent, since the fare of $91 is below the limit.

A second notification condition is shown in cell C3, which notifies the user when one particular airline is below $100. Other conditions, such as fares to other cities, could also be programmed into the same spreadsheet 60.

Each week or each day when the minder checks for changes to web pages 62, 64, cells A1, A2 are updated with the new fares. The parser searches for the marker "SFO→NYC" in web page 62 and copies the following numeric value to cell A1 as the updated numeric value. New calculations are performed using the formula in cell B1 and the notification conditions are checked using cells C1, C3. Notification is sent by e-mail if the conditions are met.

ADVANTAGES OF THE INVENTION

The calculations specified on the spreadsheet can operate on numeric values extracted from multiple web pages. This is a powerful feature since the user can combine data from different, arbitrary web pages and perform calculations on these varied data sources to receive a combined notification.

The web pages can be arbitrary web pages with different formats. Thus web pages from different companies can easily be compared automatically by the change-detection tool. Web pages do not have to follow any particular format, nor do they have to be modified for use with the change-detection tool.

The change-detection tool described herein can determine not just that a change has occurred in a document: the significance of the change to a document can be determined by localizing the numeric values of interest and performing calculations or comparisons on the data. The changed numeric values can be highlighted in the document and attached to the e-mailed change notice. Unchanged or unselected portions of the document can be deleted from report. The original document does not have to be stored; only markers from the document are archived along with the formulas, parameters, and conditions set by the user.

The invention reduces the time and effort required by a user wanting to keep abreast of changes at web sites. The user can specify the relevant portion of a web page, discarding corporate logo's, advertisements, headers and footers, and links to other web pages to focus on only numeric information of interest. Since many web pages now feature flashy advertising graphics that are frequently changed and even rotated among several different ads or advertisers, the invention can be used to filter out these annoying changes. The invention allows the user to select the numeric portions of a web page that are relevant to that user.

The invention can determine the numeric significance of the change using the calculations of the spreadsheet. Thus significant changes can be highlighted, reducing the effort required by the user to review the changes.

The invention can accumulate changes detected and combine them into a single report which is e-mailed to the user each month or other time period. The single report can list all the changes in all the registered documents and even rank the changed document by the number or significance of the values changed.

Power users can even be charged for using advanced features or numeric functions while the general public is allowed to use the basic features free of charge. Thus power users can be charged for the additional storage and computational work required for registering some documents while casual users can freely register documents using the more efficient or less robust settings.

Other web sites can include a brief message on their page that their users can be notified by e-mail when the numbers on the page changes significantly. The user selects the message and enters his or her e-mail address. The web site then sends an e-mail request to the change-detection tool at a different web site. The request contains the user's e-mail address and the URL of the web page, and the marker and formulas. Thus existing web sites can be enhanced to provide update notices to users by including a brief message on the page itself. The change detection is handled in the normal way by the change-detection-tool's web site.

ALTERNATE EMBODIMENTS

Several other embodiments are contemplated by the inventors. For example the tool has been described as for use in the public Internet, but it could also be used by private organizations behind a corporate firewall on an Intranet. Confidential financial data or budgets could be stored as documents on a corporate Intranet, and employees could register the document's URL along with a formula and thus be notified when a department is over budget by a significant amount.

The change-detection tool can be located on a server separate from the web server itself and simply be called by the site's web server. A JAVA applet can be written to be executed by the browser client. This applet performs the functions of the responder, allowing the user to input registration information such as the e-mail address and URL.

The document can first be fetched by the applet to the client, allowing the user to select the numeric fields in the document. The applet could also generate the markers and display the spreadsheet user interface, accepting the formulas, parameters and notification conditions. The applet then sends all this information to the change-detection tool web server once the user has finished registration. The applet reduces the loading on the responder, since these functions are performed at the client rather than at the server. The final registration information can then be mailed to the server with the change-detection-tool minder.

The invention has been described as operating on Internet documents. These documents are often complex web pages containing several individual files such as for graphics, text, and motion video and sound. Sometimes these files include small programs such as cgi scripts. Standard world-wide-web pages use the hyper-text-transfer protocol (http), but other protocols can be used in the URL. Gopher and file-transfer-program (ftp) documents can also be registered using their URL's.

Database engines can also be registered as a "document". The registered URL can include the lookup keywords. When the minder checks the URL for changes, the database lookup is re-executed. The results of the lookup are used as the numeric values. Thus the document can be the output from execution of a database lookup or another program. The document can thus be a temporary document or report rather than a static document. Webmasters can insert special tags into their HTML documents to explicitly identify numeric information on their pages to improve robustness, but this is not necessary for basic operation.

Highlighting can be accomplished in a variety of ways. Placing characters in the left margin is a common way to highlight text. Some mail systems use color or other effects for highlighting. Premium service could check for changes more frequently than once a week or day, perhaps checking every hour or even every few minutes. In addition to standard e-mail, the user can be notified immediately using a pager or personal-digital-assistant (PDA), or using a desktop push technology that continually sends updated Internet information to a user without using a standard browser or e-mail reader.

Change notification can be made for documents moved to another URL, documents that can no longer be found, or re-ordered documents when the numeric value's marker cannot be found. The record for a registration can store URL's and e-mail addresses in separate databases to improve storage efficiency. The URL field in the registration is then an index into the URL database. The e-mail field is likewise an index into the e-mail or users database. Using indexes improves efficiency since an index is used to point to the longer URL's and e-mail addresses. Typically a URL is shared by several users, and an e-mail address is shared by several registrations.

Instead of storing the marker, the marker may be condensed into a CRC checksum, and the checksum stored to save storage space. Markers on each side of the numeric value can be stored for robustness, facilitating finding the numeric value. The marker can also indicate a string of adjacent numbers, of which the desired numeric value is the $n^{th}$ number.

The document parser can be adaptive. The parser can "learn" which sections of the document change frequently, and which sections do not change. The marker can then be modified to include static portions and accept and changes in other portions near the desired numeric value. Thus, the marker can be modified as more copies are fetched and parsed. The user can also improve finding the numeric values by indicating during registration which sections are static and would make a good marker. The marker can thus be somewhat removed from the desired numeric field. The marker can include information of the number of numeric fields between the static marker and the desired numeric value or a character offset to the numeric field. Webmasters can also include tags to identify fields. Multiple markers can also be stored for one numeric field, and the multiple markers can be used to select the most likely field by voting.

The calculation engine can be combined with the comparator, and is typically a software procedure operating using a CPU in a general-purpose computer. The invention of change detection of numeric values can be combined with change detection of text. A simple extension of the invention is to allow the "numeric value" to be a text string. Any change in the text string could signal a change. Alternately, the notification condition could be a change in the text string and a calculation result using another numeric value being above the notification limit. An example is a user who wishes to be notified when rain is forecast. The user could register a web page with forecasts for many cities, and highlight the forecast field for his city. When the word "rain" appears, a string match occurs and user notification is made. This example could be extended to include numerical data, such as when a user wants to be notified of cold, possibly freezing rain. The user sets the notification conditions to look for the word "rain" and a numeric temperature field of less than 35 degrees. Thus, a text string match can be combined with a numeric comparison.

The change-detection tool could simply extract all numeric values from a document and display them in separate cells on the spreadsheet. The user could then choose which numeric values to use by including their cells in the formulas. Thus, the user would not have to highlight the numeric fields on the document.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A change-detection web server for detecting numerically-significant changes in web pages comprising:

a network connection for transmitting and receiving packets from a remote client and a remote web-page server;

a responder, coupled to the network connection, for communicating with the remote client, the responder registering a web page for change detection by receiving from the remote client a uniform-resource-locator (URL) identifying the web page, the responder fetching the web page from the remote web-page server and generating markers for identifying locations of numeric data fields within the web page;

a spreadsheet user-interface, coupled to the responder, for displaying a spreadsheet on the remote client, the spreadsheet having rows and columns of cells, each cell for receiving a formula from a user, the formula specifying calculations performed on the numeric data fields from the web page;

a database, coupled to the responder, for receiving the URL and the markers from the responder and for receiving the formula from the spreadsheet user-interface when the web page is registered by the remote client, the database for storing a plurality of records each containing a URL, markers, and the formula for a registered web page; and a periodic minder, coupled to the database and the network connection, for periodically re-fetching the web page from the remote web-page server by transmitting the URL from the database to the network connection, the periodic minder receiving a fresh copy of the web page from the remote web-page server, the periodic minder extracting fresh numeric values from the fresh copy of the web page from locations identified by the markers and recalculating a result of the formula using the fresh numeric values, the periodic minder signaling a detected change to the remote client when the result exceeds a predetermined notification condition, whereby a numerically-significant change in the web page is detected by re-calculating a user-entered formula which operates on numeric data from the web page, wherein changes in the web page which do not cause a re-calculated result to exceed the predetermined notification condition do not signal the remote client.

2. The change-detection web server of claim 1 wherein the database does not store the web page, the database storing a formula for re-calculating the result using the fresh numeric values on the web page, whereby storage requirements for the database are reduced by archiving the formula and not entire web pages.

3. The change-detection web server of claim 2 further comprising:

selection means, coupled to the responder, for receiving a selection from the remote client, the selection identifying the numeric data fields within the web page;

parsing means, coupled to the responder, for parsing the web page and generating the markers identifying the locations of the numeric data fields;

compare means, coupled to the periodic minder means, for comparing the result to the predetermined notification condition.

4. The change-detection web server of claim 3 wherein each record in the database further comprises:

a notification condition field for storing the predetermined notification condition, whereby the predetermined notification condition is stored in the database for each record.

5. The change-detection web server of claim 1 further comprising:

a calculation engine, receiving the formula from the database and the fresh numeric values extracted from the fresh copy of the web page, for re-calculating the result.

6. The change-detection web server of claim 1 wherein the web page is a hyper-text markup-language (HTML) web page containing HTML tags, the HTML tags for indicating formatting, layout, and hyper-links specifying URLs of other servers, the change-detection web server further comprising:

divider means, coupled to the responder, for dividing the web page into portions bound by the HTML tags;

marker means for generating the markers, the locations of the fresh numeric values being referenced by the markers to locations of the HTML tags; and report means for signaling a change in the web page when one of the markers for the web page has no matching fresh numeric value in the fresh copy of the web page, whereby the markers are generated and stored for the fresh numeric values located near the HTML tags.

7. The change-detection web server of claim 6 wherein the report means further comprises:

mailer means, coupled to the network connection, for sending a change notification message to the remote client when the change is signaled, wherein the responder receives an electronic-mail address from the remote client, the responder storing the electronic-mail address of the remote client in the database, and the mailer means reading the electronic-mail address from the database, the change notification message being sent to the remote client as an electronic-mail message addressed to the electronic-mail address, whereby the remote client is notified of the change by electronic mail.

8. The change-detection web server of claim 7 wherein the packets transmitted to the network connection are TCP/IP packets and wherein the remote client and the remote web-page server are on the Internet.

9. The change-detection web server of claim 1 further comprising:

second web-page means, coupled to the network connection, for fetching a second web page from a second remote web-page server, the responder generating second markers for identifying locations of second numeric values on the second web page in response to user selections, wherein the formulas operate on the numeric values from the web page and on the second numeric values from the second web page, whereby numeric values from two web pages are combined in formula to determine when the predetermined notification condition is met.

10. The change-detection web server of claim 9 wherein each record in the database further comprises parameters, the parameters being entered by the user into the spreadsheet user-interface, the parameters being constant numeric values independent of the web pages.

11. The change-detection web server of claim 10 wherein the formulas include a combination of operators selected from the group consisting of addition, subtraction, multiplication, division, root, minimum, and maximum.

12. A computer-implemented method for detecting a significant change in numeric fields on a web page and notifying a user of the significant change, the method comprising the steps of:

registering the web page by:
receiving an address of the user and a locator for the web page;
fetching the web page from a remote server by transmitting the locator to a network server;
extracting numeric values from selected numeric fields on the web page, the selected numeric fields selected by the user;
displaying a spreadsheet to the user, the spreadsheet having rows and columns of cells forming a grid;
displaying the numeric values in extracted-data cells of the spreadsheet;
accepting formulas input by the user in unused cells of the spreadsheet, the formulas operating on the numeric values by specifying in the formulas a row and a column of the extracted-data cells;
storing the formulas, the locator, the address of the user, and field locations on the web page of the numeric fields in a database;

after a period of time, periodically checking to determine if a significant change has occurred by:
reading the locator from the database and transmitting the locator to remote server to fetch a recent copy of the web page;
reading the field locations from the database and extracting new values of the numeric fields from the recent copy of the web page;
reading the formulas from the database and recalculating results of the formulas using the new values extracted from the recent copy of the web page;

signaling that a significant change is detected when the results from recalculation meet a notification condition;

whereby neither the web page nor the numeric values from the web page are stored in the database which stores the formulas.

13. The computer-implemented method of claim 12 wherein the step of signaling that the significant change is detected comprises:

reading the address of the user from the database and sending a message to the address of the user stating that a change has occurred, whereby the user is notified by a message when the significant change is detected.

14. The computer-implemented method of claim 13 wherein the step of registering the web page further comprises:

registering a second web page by:
receiving a second locator for the second web page;
fetching the second web page from a remote server by transmitting the second locator to the network server;
extracting second numeric values from second numeric fields on the second web page, the second numeric fields selected by the user;
displaying the second numeric values in second extracted-data cells of the spreadsheet;
accepting formulas input by the user in unused cells of the spreadsheet, the formulas operating on the numeric values and the second numeric values by specifying in the formulas a row and a column for each of the extracted-data cells and a row and a column for each of the second extracted-data cells;
storing the second locator and second field locations on the second web page of the second numeric fields on the second web page;

whereby the formulas combine numeric values from the web page and the second web page.

15. The computer-implemented method of claim 14 wherein the web page and the second web page are web pages on the world-wide web and the locator and the second locator are uniform-resource locators (URLs).

16. The computer-implemented method of claim 12 wherein the period of time is a day.

17. A computer-program product comprising:
a computer-usable medium having computer-readable program code means embodied therein for detecting numerically-significant changes in a web page, the computer-readable program code means in the computer-program product comprising:
network connection means for transmitting and receiving packets from a remote client and a remote web page server;
responder means, coupled to the network connection means, for communicating with the remote client, the responder means registering web pages for change detection by receiving from the remote client a uniform-resource-locator (URL) identifying the web page, the responder means fetching the web page from the remote web page server and generating markers identifying locations of numeric values in the web page;
spreadsheet user-interface means, coupled to the responder means, for displaying a spreadsheet of cells on the remote client, the spreadsheet including cells displaying the numeric values from the web page, the spreadsheet user-interface means including means for entering formulas into cells from the remote client, the formulas referencing the cells containing the numeric values from the web page;
database means, coupled to the responder means, for receiving the URL and the markers from the responder means when the web page is registered by the remote client, the database means further for receiving the formulas from the spreadsheet user-interface means, the database means for storing a plurality of records each containing a URL, markers, and formulas for a registered web page, the database means not storing the web page or the registered web pages, the database means storing markers and formulas for the web page; and
periodic minder means, coupled to the database means and the network connection means, for periodically re-fetching the web page from the remote web page server by transmitting the URL from the database means to the network connection means, the periodic minder means receiving a fresh copy of the web page from the remote web page server, the periodic minder means extracting fresh numeric values from the fresh copy of the web page and re-calculating a fresh result of the formulas using the fresh numeric values, the periodic minder means signaling a numerically-significant detected change to the remote client when the fresh result meets a notification condition,
whereby the numerically-significant change in the web page is automatically detected by periodically re-fetching the web page and extracting the fresh numerical values and recalculating the fresh result of the formulas entered into the spreadsheet during registration.

18. The computer-program product of claim 17 wherein the database means does not store a copy of the document, and wherein the database means does not store the numeric values extracted from the document, the database means storing the formulas, whereby storage requirements for the database means are reduced by archiving the formulas and not entire web pages.

19. The computer-program product of claim 18 wherein the computer-readable program code means further comprises:
selection means, coupled to the responder means, for receiving a selection from the remote client, the selection identifying locations of the numeric values on the web page;
parsing means, coupled to the responder means, for parsing the web page and extracting the numeric values from the web page, the parsing means generating markers for identifying locations on the web page of the numeric values; and
second parsing means, coupled to the periodic minder means and receiving the markers from the database means, for parsing the fresh copy of the web page and extracting the fresh numeric values from the fresh copy using the markers for identifying the locations on the web page of the fresh numeric values;
wherein the database means further stores the markers with the record, whereby the parsing means generates the markers for identifying the locations of the numeric values.

* * * * *